(12) United States Patent
Bleechmore et al.

(10) Patent No.: US 11,274,613 B2
(45) Date of Patent: Mar. 15, 2022

(54) ENGINE CONTROL SYSTEM AND METHOD

(71) Applicant: ORBITAL AUSTRALIA PTY LTD, Balcatta (AU)

(72) Inventors: Callan Murray Bleechmore, Vancouver (CA); John Howard Tubb, Befordale (AU); Andrew Michael Tilmouth, Mount Hawthorn (AU); Richard Albert George Woolford, Connolly (AU); Geoffrey Paul Cathcart, Mount Lawley (AU)

(73) Assignee: ORBITAL AUSTRALIA PTY LTD, Balcatta (AU)

( * ) Notice: Subject to any disclaimer, the term of this patent is extended or adjusted under 35 U.S.C. 154(b) by 368 days.

(21) Appl. No.: 16/454,132

(22) Filed: Jun. 27, 2019

(65) Prior Publication Data
US 2020/0063669 A1 Feb. 27, 2020

(30) Foreign Application Priority Data

Jun. 28, 2018 (AU) ................. 2018902340

(51) Int. Cl.
*F02D 41/00* (2006.01)
*B64C 39/02* (2006.01)
*F02B 61/04* (2006.01)

(52) U.S. Cl.
CPC ........ *F02D 41/0002* (2013.01); *B64C 39/024* (2013.01); *B64C 2201/146* (2013.01);
(Continued)

(58) Field of Classification Search
CPC ............ F02D 41/0002; F02D 2200/60; F02D 2200/70; F02D 2250/18; F02D 2400/04;
(Continued)

(56) References Cited

U.S. PATENT DOCUMENTS

| 6,502,543 | B1 * | 1/2003 | Arai ................... F02D 41/0002 123/348 |
| 2011/0146637 | A1 * | 6/2011 | Kang ................. F02D 41/0002 123/568.19 |

(Continued)

*Primary Examiner* — Joseph J Dallo
(74) *Attorney, Agent, or Firm* — Harness, Dickey & Pierce, P.L.C.

(57) ABSTRACT

A control system and method relating to operation of an internal combustion engine, particularly an engine for powering an unmanned aerial vehicle. The engine has a combustion chamber and a throttle for regulating fluid flow to the combustion chamber, the throttle being operable under the control of an electronic control unit. With the control system and method there are first and second modes optionally available for operation of the engine. In the first mode the engine is operable at a throttle setting set by a request from a first remote controller (e.g. a ground-based controller) via a second on-board controller. In the second mode the engine is operable at a prescribed minimum throttle setting asserted by the electronic control unit which limits the authority of the on-board controller. The engine is caused to operate in the second mode if a particular throttle setting determined from a request of the remote controller is less than the prescribed minimum throttle setting.

21 Claims, 6 Drawing Sheets

(52) U.S. Cl.
CPC .......... *F02B 61/04* (2013.01); *F02D 2200/60* (2013.01); *F02D 2200/70* (2013.01)

(58) Field of Classification Search
CPC ............... F02D 41/0005; B64C 39/024; B64C 2201/146; B64C 2201/044; F02B 61/04; B64D 31/06; B64D 31/04; B64D 27/04; Y02T 10/40
See application file for complete search history.

(56) References Cited

U.S. PATENT DOCUMENTS

| | | | | |
|---|---|---|---|---|
| 2012/0138016 | A1* | 6/2012 | Martin | F02P 5/1504 123/406.23 |
| 2015/0377159 | A1* | 12/2015 | Fisher | F02D 41/22 123/525 |
| 2016/0318601 | A1* | 11/2016 | Arnold | B64C 9/12 |
| 2019/0202433 | A1* | 7/2019 | Ahn | B60W 10/02 |

* cited by examiner

| Baro. Pressure (kPa Abs) → Engine Load ↓ | 42 | 47 | 52 | 57 | 62 | 67 | 72 | 77 | 83 | 89 | 95 | 101 |
|---|---|---|---|---|---|---|---|---|---|---|---|---|
| | 39 | 23 | 18 | 14 | 9 | 7 | 5 | 4 | 3 | 2 | 0 | 0 |
| | 39 | 29 | 25 | 21 | 17 | 13 | 10 | 7 | 5 | 3 | 0 | 0 |
| | 44 | 37 | 32 | 28 | 24 | 19 | 16 | 13 | 9 | 5 | 0 | 0 |
| | 52 | 45 | 39 | 34 | 30 | 25 | 21 | 18 | 14 | 10 | 2 | 0 |
| | 66 | 53 | 47 | 41 | 36 | 30 | 26 | 23 | 19 | 14 | 6 | 2 |
| | 78 | 66 | 55 | 48 | 42 | 36 | 30 | 27 | 23 | 18 | 10 | 5 |
| | 78 | 78 | 65 | 55 | 47 | 41 | 35 | 31 | 27 | 22 | 13 | 8 |
| | 78 | 78 | 75 | 65 | 54 | 46 | 39 | 36 | 31 | 26 | 16 | 10 |
| | 78 | 78 | 75 | 75 | 63 | 52 | 44 | 40 | 35 | 30 | 19 | 12 |
| | 78 | 78 | 75 | 75 | 75 | 65 | 54 | 47 | 42 | 37 | 23 | 16 |
| | 78 | 78 | 75 | 75 | 75 | 75 | 66 | 57 | 49 | 42 | 28 | 20 |
| | 78 | 78 | 75 | 75 | 75 | 75 | 75 | 66 | 57 | 52 | 35 | 24 |
| | 78 | 78 | 75 | 75 | 75 | 75 | 75 | 75 | 65 | 65 | 40 | 29 |
| | 78 | 78 | 75 | 75 | 75 | 75 | 75 | 75 | 72 | 65 | 45 | 33 |
| | 78 | 78 | 75 | 75 | 75 | 75 | 75 | 75 | 72 | 65 | 45 | 35 |
| | 78 | 78 | 75 | 75 | 75 | 75 | 75 | 75 | 72 | 65 | 45 | 35 |
| | 78 | 78 | 75 | 75 | 75 | 75 | 75 | 75 | 72 | 65 | 45 | 35 |

ENGINE CONTROL SYSTEM AND METHOD

CROSS-REFERENCE TO RELATED APPLICATION

This application claims the benefit and priority of Australian Application No. AU2018902340, filed Jun. 28, 2018. The entire disclosure of the above application is incorporated herein by reference.

FIELD

This invention relates to operation of an internal combustion engine. More particularly, the invention concerns a control system and method relating to operation of an internal combustion engine.

The invention is particularly applicable to operation of an internal combustion engine of an unmanned aerial vehicle (UAV). Accordingly, it will be convenient to hereinafter disclose the invention in relation to that exemplary application. However, it is to be appreciated that the invention is not limited to that application and may be used in other applications requiring the operation of an internal combustion engine of some form.

BACKGROUND

Discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

With an internal combustion engine, engine power and speed can be selectively increased or decreased as required by control of intake fluid (intake air or air/fuel mixture) delivered to the combustion chamber(s) of the engine. The control of the intake fluid is commonly effected by way of a throttle, with the angular position of a throttle valve regulating flow by varying the extent of restriction to flow presented by the throttle valve.

A UAV is likely to encounter a variety of operating conditions in flight, including changes in environmental and operational parameters. A change in an environmental parameter may, for example, comprise a change in altitude, leading to a corresponding change in the density of ambient air used as intake air. A change in an operational parameter may, for example, comprise a change in engine load. Such an operational change may arise in a variety of circumstances; for example, where a UAV undergoes a rapid descent or where there is a change in parasitic load on the engine of the UAV. A parasitic load on the engine may, for example, comprise an alternator driven by the engine to supply electrical power for operating various engine components and systems (such as an electronic engine management system, an ignition system and an electrical fuel pump), as well as powering ancillary equipment carried by the UAV (such as electronic sensors, cameras and other surveillance or monitoring equipment). Certain items of ancillary equipment may have a high electrical power demand when activated, causing a rapid increase in power demand by the alternator on the engine in order to supply the requisite electrical power.

In operation of a UAV engine, and in particular a small UAV engine vulnerable to relatively high power demands from parasitic loads, it is important to avoid a flight request demanding an engine operating condition that would not be appropriate for the altitude or engine load to which the engine is exposed at that particular time. Failure to avoid such a request may cause the engine speed to drop below a prescribed limit identified as a minimum acceptable speed for reliable engine operation to avoid an engine stall condition.

In practice, avoiding such a request involves limiting the minimum angle setting that a throttle valve of the engine can assume in any particular circumstance. For instance, a UAV flight at relatively low altitude and at relatively low engine load may permit a minimum angle setting of the throttle valve near a fully closed setting to sustain an engine speed necessary to avoid an adverse consequence such as engine stall. Likewise, rapid descent during a UAV flight may also permit a minimum angle setting of the throttle valve near a fully closed position to sustain a necessary engine speed. On the other hand, a UAV flight at relatively high altitude and whilst a relatively high parasitic load is placed on the engine may require a minimum angle setting of the throttle valve closer to a fully open position to sustain an engine speed sufficient to avoid an adverse consequence such as engine stall.

A flight control system provided for managing operation of a UAV, as well as the engine powering the UAV, needs to have regard to permissible minimum angle settings of the throttle valve for various circumstances encountered during operation of the UAV, (i.e. typically providing one or more predetermined flight events). Nevertheless, it is possible that a flight control system might request a throttle valve setting which is not appropriate for the altitude or engine load current at the time, thereby rendering the engine vulnerable to stall.

It is against this background that the invention has been developed.

SUMMARY

According to a first aspect of the invention there is provided a method of controlling an internal combustion engine having a combustion chamber and a throttle for regulating fluid flow to the combustion chamber, the throttle being operable under the control of an electronic control unit, the method comprising:

determining a load demand on the engine arising from a request by a flight control system;

determining a minimum permissible throttle setting corresponding to the load demand; and determining whether the load demand on the engine requires a throttle setting less than the minimum permissible throttle setting;

wherein the engine is permitted to operate in a first mode with the throttle setting requested by the flight control system if the requested throttle setting is not less than the minimum permissible throttle setting;

wherein the engine is caused to operate in a second mode (instead of the first mode) if the throttle setting requested by the flight control system is less than the minimum permissible throttle setting; and wherein in the second mode the throttle setting is limited to the minimum permissible throttle setting.

Preferably, the minimum permissible throttle setting is determined corresponding to the load demand and current environmental conditions.

The flight control system may comprise a first flight controller means, and a second flight controller means arranged to interact with the electronic control unit, whereby in the second mode the electronic control unit limits the authority of the second flight controller means to move the throttle below the prescribed minimum throttle setting.

The throttle setting may be represented by a throttle angle of a throttle valve forming part of the throttle.

Typically, a throttle is movable between a fully closed condition (fully restricting or at least minimising fluid flow) and a fully open condition (allowing maximum fluid flow therethrough). In the context of a throttle setting with reference to a minimum permissible throttle setting, a throttle setting less than a minimum throttle setting would be closed more than the minimum throttle setting (and therefore provide a greater restriction to fluid flow). Correspondingly, a throttle setting not less than a minimum throttle setting would be open at or more than the minimum throttle setting (and therefore provide a lesser restriction to fluid flow).

The first flight controller means may comprise a controller external from the engine. More particularly, the first flight controller means may comprise a controller remote from the engine (hereinafter at times referred to as a remote controller). In circumstances where the engine powers a UAV, the first flight controller means may comprise a controller remote from the UAV. Typically, the remote controller may be a ground-based or ground station controller associated with the UAV.

The second flight controller means may comprise a controller local to or on-board the engine (hereinafter at times referred to as an on-board controller). More particularly, the second flight controller means may comprise a controller incorporated in or with the electronic control unit. The electronic control unit may be incorporated in an engine management system (EMS) associated with the engine. More particularly, the electronic control unit may comprise an engine control unit (ECU) incorporated in the EMS. Typically, the on-board controller may be co-located with the engine control unit (ECU) on the UAV.

Preferably, the on-board controller is arranged in communication with the ECU.

Preferably, the ECU is arranged in communication with the throttle. In this manner, appropriate command signals are sent to the throttle from the ECU (e.g. signals requesting desired throttle settings). The remote controller may communicate with the on-board controller (and hence the ECU) via a wireless communication protocol.

The remote controller may be provided with an interface operable by a user or operator.

The user or operator may be located remotely from the engine. For example, the engine may be one configured for use with a UAV, and therefore under the control of a user or operator based at a location remote from the UAV. Typically the user or operator will be located on the ground.

The on-board controller may be provided local to the ECU. In this manner, the second flight controller means is, in effect, local to the engine, as mentioned above.

The on-board controller may communicate with the ECU via a wired connection.

The first mode of operation of the engine is effectively under the control of the user or operator and hence dictated by the remote controller which passes signals through to the engine via the on-board controller. In this manner, the first mode of operation may encapsulate normal remote operability of the engine by way of the interface, as would be understood by a person skilled in the art.

The second mode of operation of the engine is effectively dictated by the electronic control unit which operates to limit the authority of the on-board flight controller to move the throttle. In this manner, the second mode of operation may encapsulate control (for example, in a closed manner with the ECU) of the operation of the engine for a finite period; for example, until such time as the prescribed minimum throttle setting no longer exceeds a requested throttle setting.

Preferably, control of the operation of the engine reverts to the remote controller (from the ECU) once the requested throttle setting is no longer less that the minimum permissible throttle setting. In other words, control of the operation of the engine reverts to the remote controller once the requested throttle setting equals or exceeds the minimum permissible throttle setting.

In practical terms, the user or operator requests a throttle setting (e.g. throttle angle) via the remote controller that would normally result in a particular engine speed for the UAV engine. However, if that particular engine speed is not sufficient for reliable engine operation to avoid an engine stall condition for the UAV (having regard to the specific altitude or engine load at that time), the request by the user or operator is effectively ignored and the control of the throttle setting (e.g. throttle angle) is assumed by the ECU.

By way of example, in a case where a throttle setting is represented by a throttle angle of a throttle valve, a throttle angle of 0 degrees would constitute a fully closed condition and a throttle angle of 90 degrees would constitute a fully open condition. In this context, a throttle setting of say 40 degrees would be (a) open more than a throttle setting of say 20 degrees and (b) open less than a throttle setting of say 60 degrees. Thus, in accordance with the present invention, if the minimum permissible throttle setting were say 40 degrees, a request by a user or operator for a throttle setting of 60 degrees would be allowed, and control would remain with the user or operator via the remote controller and on-board controller. However, a request for a throttle setting of say 20 degrees would be ignored, and control of the throttle setting would be assumed by the ECU which effectively limits the authority of the on-board controller and sets the minimum throttle setting of 40 degrees.

The prescribed minimum throttle setting in effect represents a minimum speed setting for the UAV engine (having regard to the altitude or engine load current at the time).

The prescribed minimum throttle setting (which is asserted by the ECU and compared against the requested throttle setting arising from a request by the remote controller) may be generated by reference to a data structure such as a look-up table or map. The look-up table or map may be stored in computer readable memory associated with the electronic control unit.

The data structure may comprise a representative data set comprising correlated data sampled over an entire operational envelope contemplated for the engine. The data may, for example, comprise minimum permissible throttle settings correlated with respect to: (a) an environmental parameter such as barometric pressure (which is indicative of altitude); and (b) engine demand which may be represented by an appropriate operational parameter such as fuel demand, load on the engine, or intake air flow. Fuel demand may be identified in any appropriate way; for example, as fuel per cycle (FPC) (being fuel in milligrams per cylinder per cycle of the engine). With this arrangement, there is a specified minimum throttle setting permissible for any combination of altitude (barometric pressure) and engine demand. Of course, other environmental and operational parameters may be used, either instead of or in conjunction with, those discussed herein, as would be understood by a person skilled in the art.

The engine may comprise a single-cylinder engine or a multi-cylinder engine.

The engine may comprise a spark-ignition engine or a compression-ignition engine.

The engine may comprise a two-stroke or a four-stroke engine.

The engine may comprise a dual fluid fuel injection system or a single fluid fuel injection system.

According to a second aspect of the invention there is provided a method of controlling an internal combustion engine having a combustion chamber and a throttle for regulating fluid flow to the combustion chamber, the throttle being operable under the control of an electronic control unit, the method comprising providing first and second modes optionally available for operation of the engine, wherein in the first mode the engine is operable at a throttle setting set by a request from a first remote controller via a second on-board controller and wherein in the second mode the engine is operable at a prescribed minimum throttle setting asserted by the electronic control unit which limits the authority of the on-board controller, the method further comprising determining a throttle setting arising from a request from the remote controller, comparing the determined throttle setting with the prescribed minimum throttle setting asserted by the electronic control unit, wherein the engine is caused to operate in the second mode if the throttle setting determined from the request of the remote controller is less than the prescribed minimum throttle setting.

In this second aspect of the invention, the throttle setting determined from the request from the remote controller corresponds to the throttle setting requested by a flight controller in the first aspect of the invention.

According to a third aspect of the invention there is provided a vehicle powered by an internal combustion engine, the engine being controlled by a method according to the first or second aspect of the invention.

The vehicle may comprise a UAV. Other vehicles are also contemplated, including land and marine vehicles, as well as other aerial vehicles (aircraft).

According to a fourth aspect of the invention there is provided a control system for an internal combustion engine having a combustion chamber and a throttle for regulating fluid flow to the combustion chamber, the throttle being operable under the control of an electronic control unit, the control system comprising a first remote controller and a second on-board controller, the remote controller being configured to request a throttle setting for operation of the engine via the on-board controller in a first mode, the electronic control unit being configured to assert a prescribed minimum throttle setting for operation of the engine in a second mode, means for determining a throttle setting arising from the request from the remote controller, means for comparing the determined throttle setting with the prescribed minimum throttle setting asserted by the electronic control unit, wherein the engine is caused to operate in the second mode if the throttle setting determined from the request of the remote controller is less than the prescribed minimum throttle setting.

According to a fifth aspect of the invention there is provided a UAV powered by an internal combustion engine, the engine having a control system according to the fourth aspect of the invention.

DRAWINGS

Further features of the present invention are more fully described in the following description of an embodiment thereof. This description is included solely for the purposes of exemplifying the present invention. It should not be understood as a restriction on the broad summary, disclosure or description of the invention as set out above. The description will be made with reference to the accompanying drawings in which.

The drawings shown are not necessarily to scale, with emphasis instead generally being placed upon illustrating the principles of the present disclosure.

The figures depict an embodiment exemplifying the principles of the present disclosure. The embodiment illustrates a certain configuration; however, it is to be appreciated that the inventive principles can be implemented by way of many different configurations, as would be obvious to a person skilled in the art, whilst still embodying any of the inventive principles. These configurations are to be considered within the embodiment described herein.

DETAILED DESCRIPTION

In the following detailed description, the present invention is described in connection with a preferred embodiment. However, to the extent that the following description is specific to a particular embodiment or a particular use of the present techniques, it is intended to be illustrative only and merely provides a concise description of the exemplary embodiment. Accordingly, the present invention is not limited to the specific embodiment described below, but rather the invention includes all alternatives, modifications, and equivalents falling within the true scope of the appended claims.

The embodiment will be described with reference to an internal combustion engine system 10 as shown schematically in FIG. 1. The internal combustion engine system 10 has been devised particularly for use with a UAV, although it may of course have other applications. In case of a UAV, the engine system 10 might not have certain components which would otherwise be expected (as will become apparent later), in order to satisfy the packaging and weight requirements in relation to use with a UAV, and to also reduce complexity.

The engine system 10 comprises a small, single-cylinder reciprocating piston two-stroke engine 12 operating under the control of an electronic control unit (ECU) 14. The engine 12 may be fuelled with any appropriate fuel, including gasoline and heavy fuels (e.g. military fuels such as JP-5 and JP-8).

The engine system 10 further comprises a dual-fluid direct injection system 16 facilitating a gas-assist fuel delivery process. In the embodiment to be described, the gas comprises air thereby providing an air-assist fuel delivery process wherein fuel entrained in the air is delivered directly into a combustion chamber of the engine 12.

The engine 12 comprises an engine block 17 and a cylinder head 18 which together define a cylinder 20 and a crankcase 22. A piston 24 is accommodated in the cylinder 20. The cylinder 20 and the piston 24 cooperate to define the combustion chamber 26.

The piston 24 is connected to a crankshaft 28 rotatably supported within the crankcase 22 in known manner.

An air intake system 30 is provided to deliver combustion air into the crankcase 22 for delivery into the combustion chamber 26 by crankcase compression via transfer port 31. The air intake system 30 includes an air intake path 32 extending between an intake end 34 incorporating an air filter 36, and an outlet end 37 opening into the crankcase 22. The air intake path 32 has an air flow sensor 38 providing signals to the ECU 14 indicative of air flow. The air intake path 32 also has an air flow control valve 39 operable under the control of the ECU 14. The air flow control valve 39 comprises a throttle having a throttle valve 39a, with the angular position of the throttle valve 39a regulating air flow by varying the extent of restriction to the air flow presented by the throttle valve. The throttle valve 39a is selectively movable between a fully closed condition (fully restricting or at least minimising fluid flow) and a fully open condition (allowing maximum fluid flow). The throttle valve 39a is selectively movable into any angular position between the fully open and fully closed conditions by a throttle position controller 33 (refer to FIG. 5) which may comprise a servo motor (not shown) operating under the control of an electronic throttle control module (not shown) in communication with or integrated into the ECU 14.

It should however be noted that in other arrangements the air intake path 32 may not necessarily include an air flow sensor, and that the inclusion of the air flow sensor 38 in the current embodiment in no way limits the scope of the present invention. For example, in an alternative arrangement, the air flow sensor 38 could be replaced with a combined temperature and absolute pressure sensor (or a T-MAP sensor), the signals of which are used within the ECU 14 to provide inputs to a calculation to determine air flow.

A lubrication system 40 is provided to deliver lubricating oil into the air intake path 32 for entrainment in intake air flow into the crankcase 22. The lubrication system 40 includes an oil reservoir 42 and an oil pump 44 which is operable under the control of the ECU 14.

A fuel supply system 50 is provided to deliver fuel to the dual-fluid direct injection system 16. The fuel supply system 50 includes a fuel reservoir 52 and an electrical fuel pump 54 which is operable under the control of the ECU 14. The fuel supply system 50 further includes a fuel supply line 56 adapted to receive fuel from the fuel reservoir 52 and to deliver it to the dual-fluid direct injection system 16, and a fuel return line 58 to return excess liquid fuel to the fuel reservoir 52 in known manner. The fuel pump 54 is associated with the fuel supply line 56. The fuel supply system 50 also includes a fuel pressure regulator 59 for regulating the fuel pressure against air pressure in the dual-fluid direct injection system 16, as would be understood by a person skilled in the art.

An ignition system 60 is provided for igniting a combustible mixture within the combustion chamber 26. The ignition system 60 is also operable under the control of the ECU 14.

A sensor 62 is operably arranged to provide signals to the ECU 14 indicative of the speed and rotational position of the crankshaft 28.

The dual-fluid direct injection system 16 facilitating the air-assist fuel delivery process comprises a fuel metering device 70 and a fluid delivery device 72 operating in tandem. Fuel metered from the fuel metering device 70 is delivered into a mixing zone 75 for mixing with air received from a pressurised supply to provide an air-fuel mixture for injection by the fluid delivery device 72 into the combustion chamber 26. In the arrangement shown, the fuel metering device 70 comprises a fuel injector 71, and the fluid delivery device 72 comprises a fluid delivery injector 73. The pressure of fuel supplied to the fuel metering device 70 is controlled by the fuel pressure regulator 59.

The fuel metering device 70 and the fluid delivery device 72 are each operable in response to control signals received from the ECU 14. The operation of each device 70, 72 is controlled in terms of the timing of opening and the duration of opening thereof in a regime determined by the ECU 14.

A gas supply system 90 is provided to supply pressurised air to the dual-fluid direct injection system 16. More particularly, the gas supply system 90 is operable to supply air under pressure to the fluid delivery device 72, where on opening of the fluid delivery device 72 pressurised air can flow through the fluid delivery device 72 and be delivered into the combustion chamber 26. The pressurised air communicates with the mixing zone 75, and when the fluid delivery device 72 is opened, any fuel metered into the mixing zone 75 by the fuel metering device 70 is entrained by the pressurised air and delivered through a valve port 80 into the combustion chamber 26.

The gas supply system 90 comprises an air flow line 92 extending between an air compressor 94 and the fluid delivery device 72. The air compressor 94 is driven mechanically by the engine 12 and as such operates independently of the ECU 14; that is, the air compressor 94 is not directly controlled by the ECU 14. In the arrangement shown, the air compressor 94 receives intake air from the air intake system 30 via the crankcase 22; that is, the intake of the air compressor 94 is in communication with the crankcase 22 to receive intake air for compression.

Figure 1:
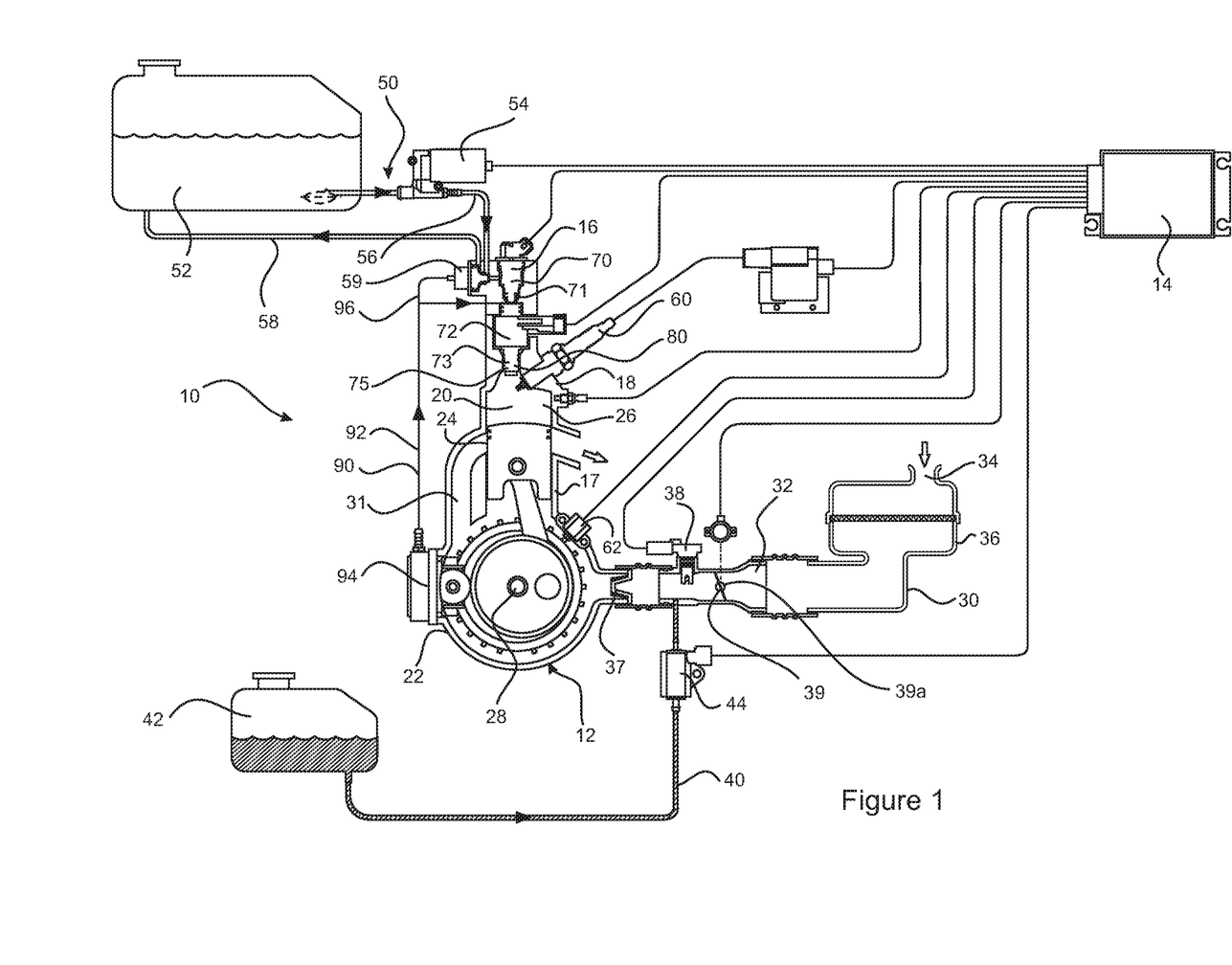
FIG. 1 is a schematic representation of an engine system operable in accordance with an embodiment of the control system and method according to the invention.

The fuel pressure regulator 59 is in communication with the gas supply system 90, as shown in FIG. 1. More particularly, the fuel pressure regulator 59 is in communication with air flow line 92 via branch line 96.

The ECU 14 is configured to be responsive to information received by various sensors by controlling and/or adjusting one or more operating parameters of the engine system 10. The ECU 14 includes a timing means (not shown) such as a counter operable to delay initiation of certain of the operating parameters of the engine system 10 for a prescribed time duration.

The engine system 10 shown is adapted to be cranked for start-up by an external torque drive releasably coupled to the engine crankshaft 28. Further, electrical energy for operating various engine components and systems (such as the ECU 14, the electrical fuel pump 54, the ignition system 60, the fuel metering device 70, and the fluid delivery device 72) is generated by a generator (not shown) mechanically coupled to the engine 12 and operable upon cranking and subsequent running of the engine. The engine 12 may however be configured to include a battery and starter-motor system and the exclusion of these elements in the current embodiment in no way limits the scope of the present disclosure.

In the context of the engine system 10 being used as a means of propulsion for a remotely operated UAV, as with the present embodiment, it is often the case that the engine output is determined via a throttle setting that is controlled via a flight control system, with the flight control system acknowledging and processing high level control inputs from a human operator. The flight control system essentially has multiple components, comprising a device interface at ground level (typically known as the 'ground station') and a device mounted on-board the UAV (known as the 'flight controller'). Communication between the ground station and the flight controller typically occurs using wireless communications and the like.

Dependent on the UAV in question, an operator in control of the ground station can control the UAV directly (i.e. fly the UAV from the ground remotely). A controller at the ground station sends and receives signals to control and determine flight path and flight speed etc, including signals to the engine of the UAV via the on-board flight controller to the ECU. Equally, control of the UAV can be automated allowing the on-board flight controller to follow a designated path with the ground station monitoring the flight (i.e. in such circumstances there is never a need to directly 'fly' the UAV from the ground station). However, if the UAV is operating in an unstable manner it typically can only be controlled directly by the on-board flight controller. The on-board flight controller typically receives information such as a flight plan prior to flight beginning and follows the plan in an automated fashion. The ground station can also update the flight plan or destination or altitude or send new target headings or way points.

The on-board flight controller and engine ECU are continuously logging data relative to operation of the UAV and operation of the engine, with data also being sent back to the ground station as may be required. This includes all manner of flight information and updates on engine behaviour (e.g. fuel and oil usage etc) and diagnostics.

Figure 2:
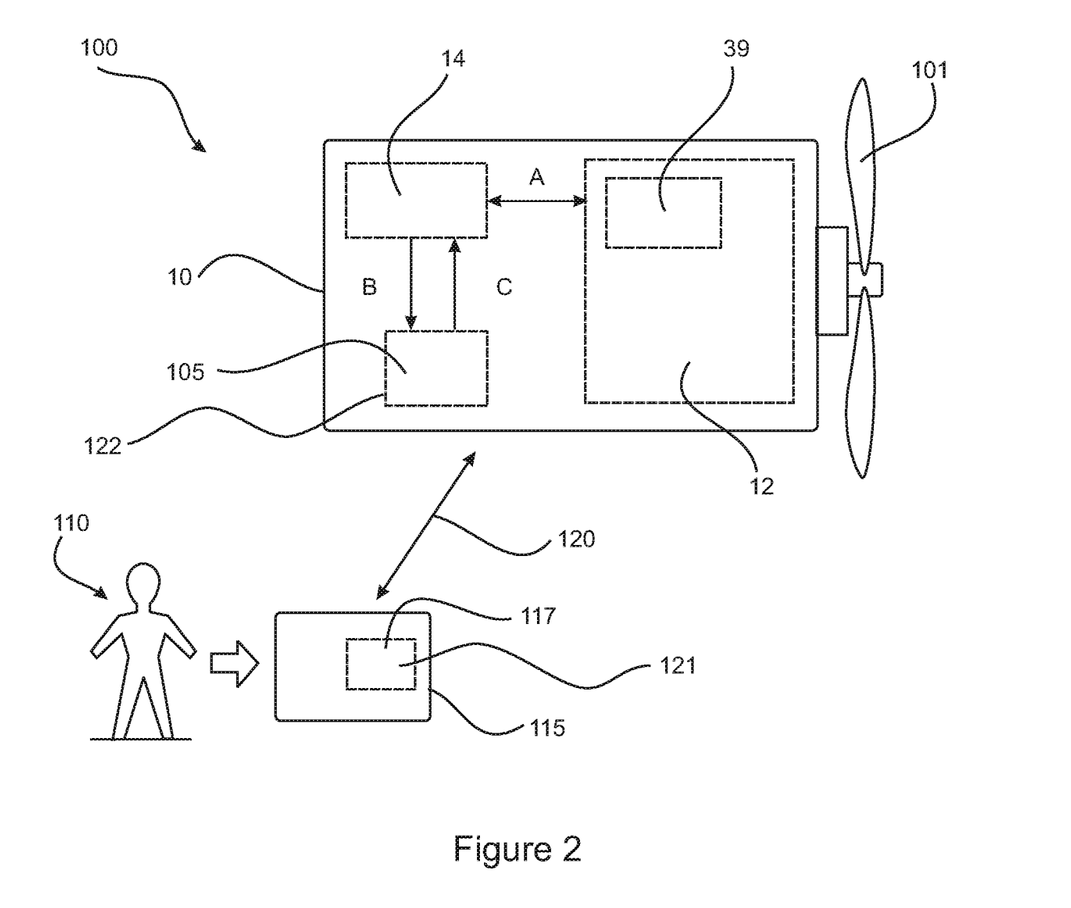
FIG. 2 provides a schematic representation of operational control of a UAV configured to include the embodiment of the control system and method according to the invention.

With the above background in mind, in this embodiment, the engine system 10 is installed in a UAV 100, a typical operational overview of which is shown in FIG. 2. In FIG. 2, the engine system 10 including the throttle 39 are depicted schematically in block form. The engine system 10 is arranged to drive a propulsion element provided in the form of a propeller 101. The ECU 14 is configured to, at least in part, send appropriate signals to the throttle 39 of the engine 12 for controlling operation of the engine by way of communication pathway A. The ECU 14 is also configured to receive feedback signals from the engine 12 by way of communication pathway A. For example, the ECU 14 may receive a feedback signal from the throttle 39 which indicates the actual position of the throttle valve 39a of the throttle 39 to provide assurance that a corresponding throttle servo (not shown) has positioned the throttle valve 39a in a position as expected. The UAV 100 further comprises a local controller 105 (effectively an on-board flight controller) which is configured in communication with the ECU 14 by way of communication pathways B (from ECU 14 to local controller 105) and C (from local controller 105 to ECU 14) so as to be capable of controlling the throttle position of the throttle 39.

The UAV 100 is configured to be remotely operable by a remote user 110 by way of an interface module 115. The interface module 115 comprises an external controller 117 which is configured to receive inputs from the user 110 for processing and transmittal to the ECU 14 of the UAV 100 via the local controller 105. Transmittal of the remote operational commands/signals (for control/operation of the UAV 100 and engine 12) is by way of wireless transmission as depicted schematically in FIG. 2 by a line identified by reference numeral 120. The external controller 117 is similarly able to receive signals and feedback from the local controller 105 in respect to control/operation of the UAV 100 and engine 12 by way of said wireless transmission.

The external controller 117 may hereinafter be referred to as a remote controller 121 and local controller 105 may hereinafter be referred to as an on-board controller 122.

In operating the UAV 100 remotely, the user 110 can issue operational commands/signals via the remote controller 121, including flight requests which demand certain engine operating conditions such as, for example, a particular engine speed or engine power.

Engine power and speed can be selectively increased or decreased by control of the throttle 39, with the angular position of the throttle valve 39a (as shown in FIG. 1) regulating air flow along air intake path 32 within the air intake system 30 of the engine 12.

When the user 110 issues a flight request via the remote controller 121, including flight requests which demand certain engine operating conditions, the request is received by the on-board controller 122 and communicated to the ECU 14. The flight request comprises a throttle setting requested by the remote controller 121. The ECU 14 determines a load demand on the engine 12 arising from the throttle setting requested by the remote controller 121, having regard to environmental and operational parameters current at the time (e.g. the current altitude or engine load). Additionally, the ECU 14 determines a minimum permissible throttle setting corresponding to the load demand. The minimum permissible throttle setting in effect represents a minimum speed control setting for the UAV engine under the operating conditions at the time. Thereafter, the ECU 14 compares the two settings and determines whether the load demand on the engine 12 requires a throttle setting less than the minimum permissible throttle setting.

If the determination is that the load demand on the engine 12 does not require a throttle setting less than the minimum permissible throttle setting, the request is transferred to the throttle position controller 33 and the requested throttle setting is implemented. This represents a first mode of operation of the engine system 10, in which control is effectively with the user 110 via the remote controller 121.

If, on the other hand, the determination is that the load demand on the engine 12 requires a throttle setting less than the minimum permissible throttle setting, the request is effectively ignored and control of the throttle setting is assumed by the ECU 14. The ECU effectively limits the authority of the on-board controller 122 and implements the minimum throttle setting via the throttle position controller 33. This represents a second mode of operation of the engine system 10.

It is notable that flight requests from the remote controller 121 are passed through the ECU 14 via the on-board controller 122. In this way, the ECU 14 can intercept a flight request from the remote controller 121 and limit the authority of the on-board controller 122 to control the operation of the engine 12. Actual throttle settings are thereafter implemented by the throttle position controller 33.

In the second mode of operation, control of the operation of the engine system 10 is effectively provided by the ECU 14 so long as the load demand on the engine 12 requires a throttle setting less than the minimum permissible throttle setting. Control of operation of the engine system 10 reverts to the remote controller 121 (i.e. via the second on-board controller 122) once the requested throttle setting is no longer less than the minimum permissible throttle setting. In other words, control of the operation of the engine system 10 reverts to the remote controller 121 once the requested throttle setting equals or exceeds the minimum permissible throttle setting.

An example of the control system and method in operation will now be described with reference to FIGS. 3 to 6.

Figure 4:
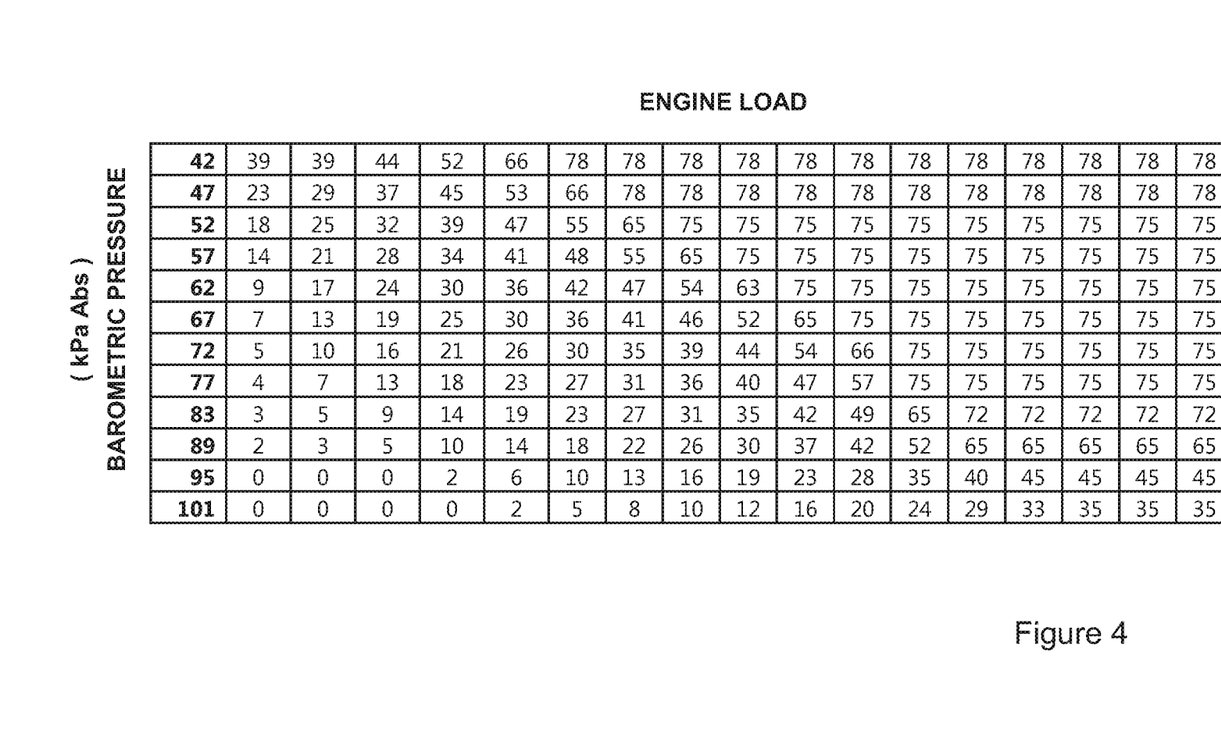
FIG. 4 is a typical example of a look-up table used in the embodiment, with the look-up table having ordinates indicative of barometric pressure and engine load demand.

The prescribed minimum throttle setting (which is asserted by the ECU 14 for comparison to the requested throttle setting arising from a request by the remote controller 121) is generated by reference to a data structure such as a look-up table or map, as depicted in FIG. 4. The look-up table or map is stored in computer readable memory associated with the ECU 14.

The data structure comprises a representative data set comprising correlated data sampled over an entire operational envelope contemplated for the engine. The data may, for example, comprise minimum permissible throttle settings correlated with respect to various parameters (both operational and environmental).

Figure 3:
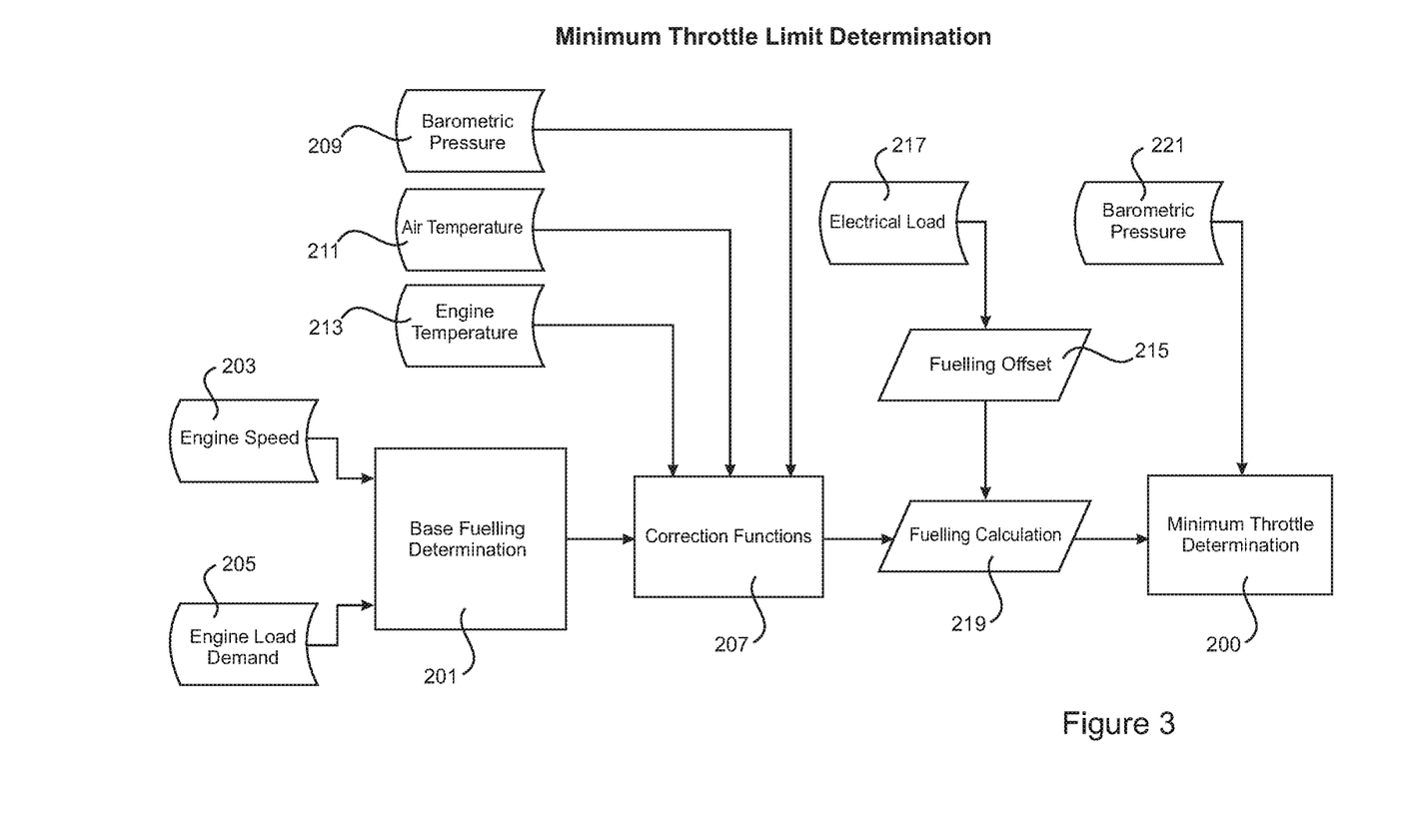
FIG. 3 is a block diagram depicting a process in which various parameters (operational and environmental) are assessed in a determination of a minimum throttle setting.

The process by which various parameters (operational and environmental) are assessed in a determination of a minimum throttle setting is depicted schematically in FIG. 3. The parameters include: (a) an environmental parameter such as barometric pressure (which is indicative of altitude); and (b) engine demand which may be represented by an appropriate operational parameter such as fuel demand, load demand, torque demand or intake air flow. Fuel demand may be identified in any appropriate way; for example, as fuel per cycle (FPC) (being fuel in milligrams per cylinder per cycle of the engine). With this arrangement, there is a specified minimum throttle permissible for any combination of altitude (barometric pressure) and engine demand.

More particularly, in this example as shown in FIG. 3, the determination of a minimum throttle setting (block 200) is as follows. The base fuelling determination (identified by block 201) is determined having regard to engine speed (block 203) and engine load demand (block 205). The base fuelling determination (block 201) may optionally be refined to provide a revised fuelling determination (block 207) having regard to barometric pressure (block 209), air temperature (block 211) and/or engine temperature (block 213). The revised fuelling determination (block 207) is used, optionally with a fuelling offset (block 215) assessed having regard to electrical load (block 217) to provide a fuelling calculation (block 219). The fuelling calculation (block 219) and the barometric pressure (block 221) are used to provide the minimum throttle determination (block 200). The minimum throttle determination (block 200) involves reference to a look-up table or map, an example of which is depicted in FIG. 4. It should however be noted that not all parameters identified in FIG. 3 are necessarily used in all circumstances to determine a minimum throttle setting for the engine system.

Figure 5:
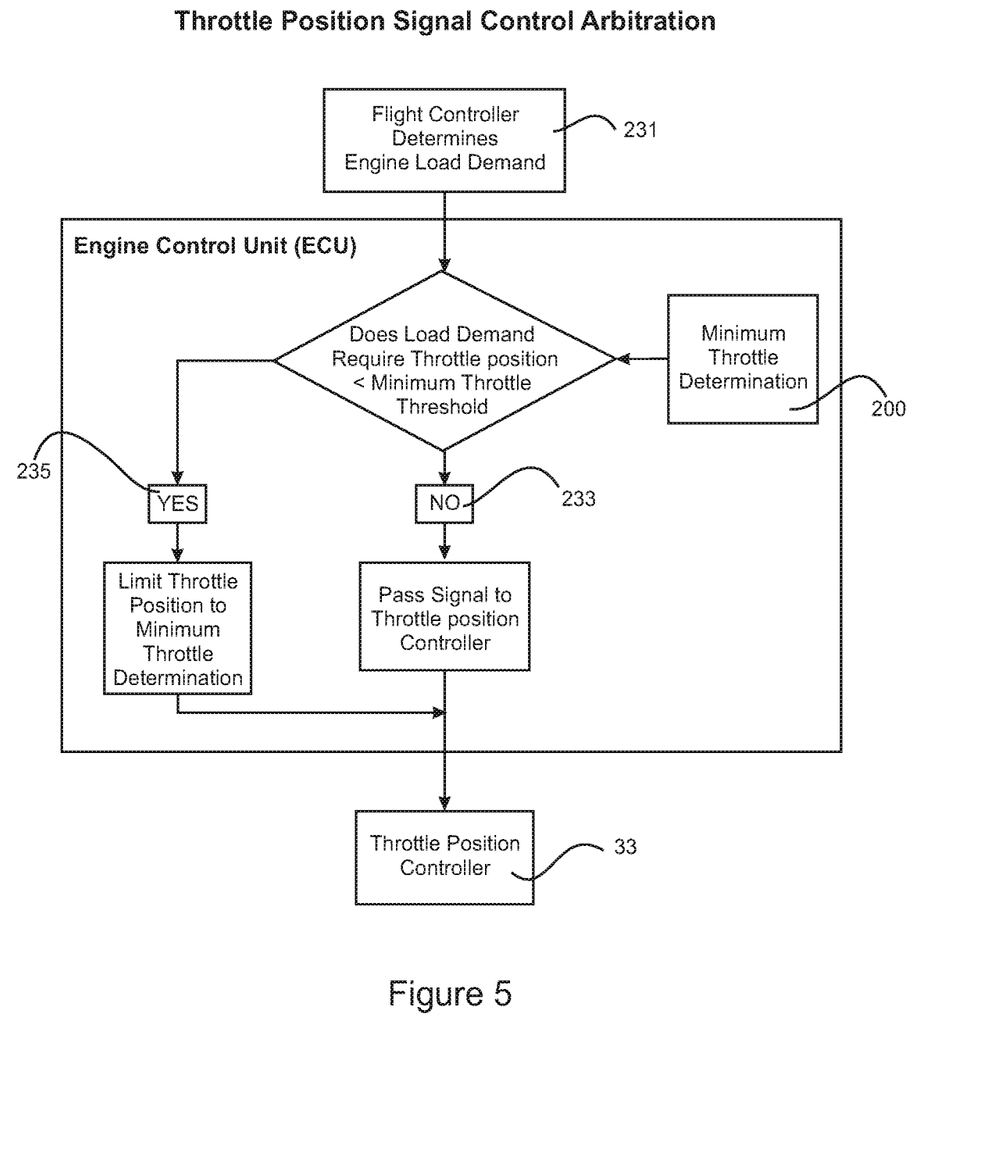
FIG. 5 is a schematic flow chart illustrating steps performed by the embodiment in controlling the engine system of the UAV.

Referring now to FIG. 5, which is a schematic flow chart illustrating steps performed by the embodiment in controlling the engine system 10 of the UAV 100, a load demand on the engine 12 is determined (block 231), arising from the throttle setting requested by the remote controller 121. The ECU 14 compares the throttle setting requested by the remote controller 121 and the minimum throttle determination (block 200). If the determination is that the load demand on the engine 12 does not require a throttle setting less than the minimum permissible throttle setting (block 233), the request is transferred to the throttle position controller 33 via the on-board controller 122 and the requested throttle setting is implemented. This represents a first mode of operation of the engine system 10, in which control is effectively with the user 110 via the remote controller 121. If, on the other hand, the determination is that the load demand on the engine 12 requires a throttle setting less than the minimum permissible throttle setting (block 235), the request is effectively ignored and control of the throttle setting is assumed by the ECU 14. This represents a second mode of operation of the engine system 10.

As described previously, control of the operation of the engine system 10 remains with the ECU 14 so long as the load demand on the engine requires a throttle setting less than the minimum permissible throttle setting. Control of operation of the engine system 10 reverts to the remote controller 121 (via the on-board controller 122) once the requested throttle setting equals or exceeds the minimum permissible throttle setting. In this way, the control system effectively does not allow a flight request which may be demanding an engine operating condition that is not appropriate for the current altitude and engine load. Exceeding the limits set by the control system (i.e. in terms of the minimum permissible throttle setting) could cause the engine speed to drop below desired limits and in a worst case scenario result in an engine stall.

The minimum permissible throttle setting (as determined by block 200 in FIG. 3) varies with operational and environmental parameters, as previously described. This may be better understood with reference to FIG. 6 which is a graph in the form of a line chart having a vertical ordinate 241 indicative of minimum throttle setting (position) and a horizontal ordinate 243 indicative of engine load demand, and plot lines 250 representing various barometric pressures. By way of example, plot line 250a relates to a barometric pressure of 101 kPa, plot line 250b relates to a barometric pressure of 89 kPa and plot line 250c relates to a barometric pressure of 83 kPa. Each plot line 250 identifies coordinates of minimum throttle setting (position) and engine load demand for a specific barometric pressure.

Figure 6:
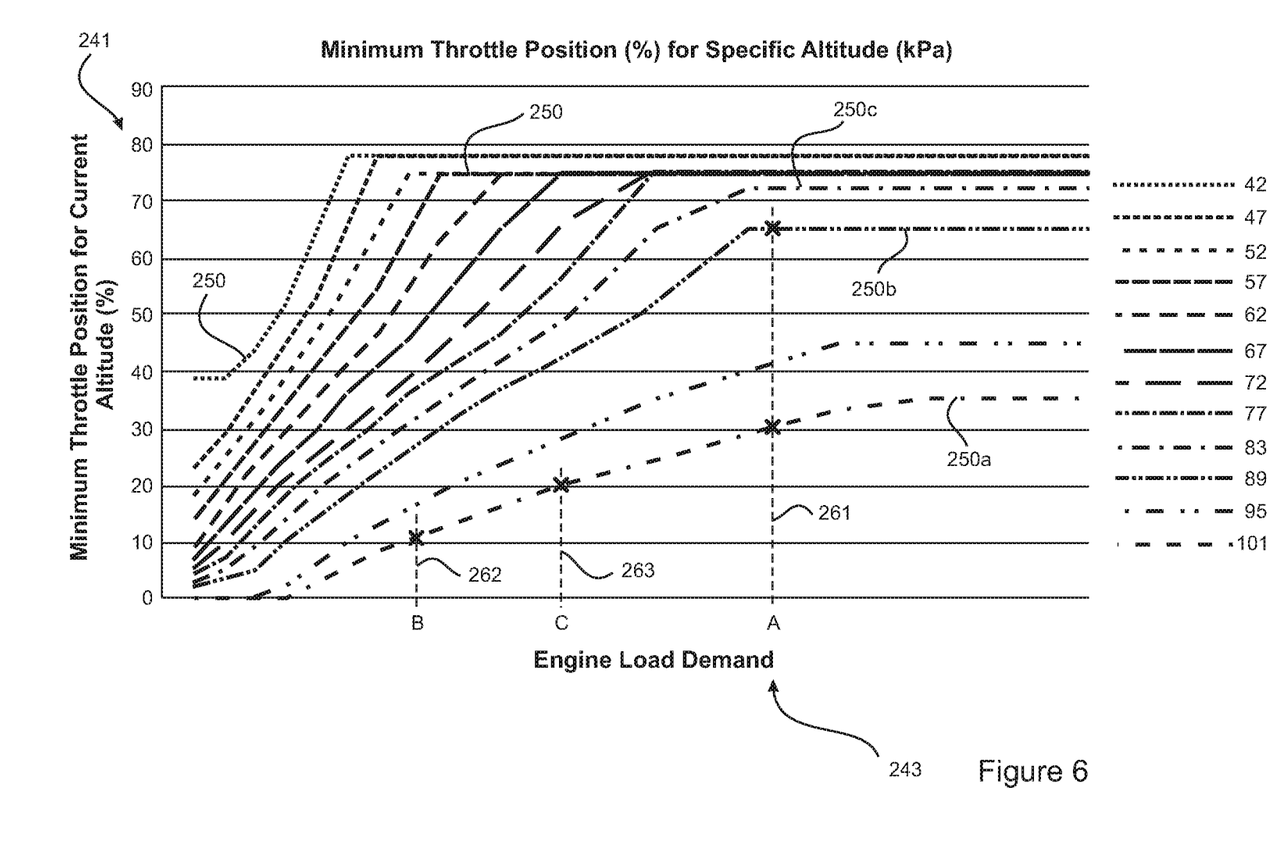
FIG. 6 is a graph in the form of a line chart having ordinates indicative of minimum throttle setting and engine load demand, and plot lines representing various barometric pressures, each plot line identifying coordinates of minimum throttle setting (position) and engine load demand for a specific barometric pressure.

Each plot line 250 in FIG. 6 identifies a minimum permissible throttle setting, and thus any condition above the relevant plot line is available as a permissible throttle setting; that is, as an allowable setting for operation of the engine system 10 in the first mode of operation. It is only when the requested throttle setting falls below the relevant plot line that the engine is caused to operate in the second mode of operation.

As noted previously, barometric pressure varies with altitude, so the minimum permissible throttle setting (position) varies with changes in altitude of the UAV 100 while in flight. By way of example, this can be seen with reference to vertical line 261 on the graph of FIG. 6, where a change in altitude (at a constant engine load A) leading to a change in barometric pressure from 101 kPa (plot line 250a) to 89 kPa (plot line 250b) requires a variation of minimum permissible throttle setting from about 30% to about 65%.

Likewise, a change in the engine load may have an affect on the minimum permissible throttle setting. By way of example, this can be seen with reference to vertical lines 262 and 263 on the graph of FIG. 6, where a change in engine load from B to C (at a constant altitude of 101 kPa) requires a variation of the minimum permissible throttle setting from about 10% to about 20%.

As alluded to above, a specific case in which a user 110 might request an inappropriate engine demand might occur when the UAV 100 is descending. In order to achieve a rapid descent, the lowest possible engine speed might be requested by the user, and this may invoke a condition which limits operation of the throttle 39 of the engine system 10 (thus invoking the second mode of operation for the engine system 10).

Another case might be one in which the UAV 100 is operating with a specific throttle demand in place at the request of the user 110 (via the remote controller 121). The throttle demand which is in place at the time may be appropriate for the current conditions. However, circumstances could potentially change; for example, with an increase in parasitic load (electrical load) on the engine. With the change in engine load demand, what was previously an allowable throttle setting may no longer continue to be the case, requiring corrective action. If the user 110 does not respond appropriately by increasing the throttle setting as necessary, the control system would effectively take over to invoke a revised required minimum throttle setting (thus invoking the second mode of operation of the engine system 10).

Engines in which potential parasitic loads are relatively large in comparison to maximum engine output are particularly susceptible to such a case as described above. For instance, in the case of a small engine (e.g. a 50 cc engine), engine speed could fall significantly if an electrical load is increased without concurrently increasing the throttle setting. By way of example, at an altitude of 15,000 feet, a 50 cc engine might generate say 800 W of power at a 50% throttle setting, and might experience a maximum electrical demand of say 210 W (additional to the load exerted by the propeller). In this example, maximum electrical demand represents a significant proportion of available engine power, thus requiring careful control of engine operation in order to support the demand.

Another instance of a change in circumstance which might require an increase in the minimum throttle setting is where a fault in the engine system 10 requires compensatory action by way of an increase in engine speed. For instance, an alternator being driven by the engine 12 may experience a loss of phase, necessitating an increase of engine speed for the alternator to continue to deliver sufficient electrical power for the engine system 10. The need for an increase in engine speed requires a change in throttle setting, and thus potentially an increase in the minimum throttle setting.

From the above it should be evident that the control system applies the aforementioned minimum permissible throttle settings or limits in such a way as to not limit the engine operating envelope unnecessarily. That is, the minimum permissible throttle setting or limit for a specific altitude is varied according to the current engine load (i.e. fuel demand in the previous examples) such that if the engine load is higher the minimum permissible throttle setting will be increased.

From the foregoing, it is evident that the present embodiment provides a control system and method which permits the user 110 to maintain control of the UAV 100 (via remote controller 121 and on-board controller 122) throughout the whole range of the operational envelope of the engine system 10, so long as flight requests invoked by the user 110 are deemed appropriate for the current altitude or engine load. If, however, the user 110 requests a throttle valve setting which is not appropriate for the altitude or engine load current at the time (thereby potentially rendering the engine vulnerable to a stall condition), the request is effectively ignored and control of the throttle setting is assumed autonomously by the engine system 10 (i.e. more specifically, by the ECU 14 in this embodiment). Control of the operation of the engine system 10 would remain autonomous (i.e. in place with the ECU 14) so long as the load demand on the engine 12 requires a throttle setting less than the minimum permissible throttle setting determined for the engine system 10. Control of operation of the engine system 10 would revert to the user 110 (via remote controller 121 and on-board controller 122) once the requested throttle setting equals or exceeds the minimum permissible throttle setting for the prevailing operating conditions.

The foregoing disclosure is intended to explain how to fashion and use the particular embodiment described, rather than to limit the true, intended, and fair scope and spirit of the present disclosure. The foregoing description is not intended to be exhaustive, nor to be limited to the precise forms disclosed.

It should be appreciated that various modifications can be made without departing from the principles described herein. Therefore, the principles should be understood to include all such modifications within its scope.

While the embodiment described herein was primarily developed and discussed in relation to an internal combustion engine applicable for a UAV, it should be understood that the principles described herein may have application to various other vehicles, machines, apparatus and devices having internal combustion engines. Such internal combustion engines may comprise engines in either single-cylinder or multi-cylinder configurations. Further, the engines may be either spark-ignition engines or compression-ignition engines, as well as both two-stroke and four-stroke engines. Still further, the engines may comprise either a dual-fluid fuel injection system or a single-fluid fuel injection system.

The terminology used herein is for the purpose of describing particular example embodiment only and is not intended to be limiting.

As used herein, the singular forms "a", "an" and "the" may be intended to include the plural forms as well, unless the context clearly indicates otherwise.

The method steps, processes, and operations described herein are not to be construed as necessarily requiring their performance in the particular order discussed or illustrated, unless specifically identified as an order of performance. It is also to be understood that additional or alternative steps may be employed.

Reference to any positional descriptions, such as "top", "bottom" and "side", are to be taken in context of the embodiment described and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiment.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Furthermore, in the embodiment described herein (including the following claims), the word "determining" is understood to include receiving or accessing the relevant data or information.

Throughout this specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification and the claims that follow, unless the context requires otherwise, the word "include" or variations such as "includes" or "including", will be understood to imply the inclusion of a stated integer or group of integers but not the exclusion of any other integer or group of integers.

Future patent applications maybe filed in Australia or overseas on the basis of, or claiming priority from, the present application. It is to be understood that the following claims are provided by way of example only, and are not intended to limit the scope of what may be claimed in any such future application. Features may be added to or omitted from the provisional claims at a later date so as to further define or re-define the invention or inventions.

The invention claimed is:

1. A method of controlling an internal combustion engine having a combustion chamber and a throttle for regulating fluid flow to the combustion chamber, the throttle being operable under the control of an electronic control unit, the method comprising:
determining a load demand on the engine arising from a request by a flight control system;
determining a minimum permissible throttle setting corresponding to the load demand; and
determining whether the load demand on the engine requires a throttle setting less than the minimum permissible throttle setting;
wherein the engine is permitted to operate in a first mode with the throttle setting requested by the flight control system if the requested throttle setting is not less than the minimum permissible throttle setting;
wherein the engine is caused to operate in a second mode instead of the first mode if the throttle setting requested by the flight control system is less than the minimum permissible throttle setting;
wherein in the second mode the throttle position is limited to the minimum permissible throttle setting; and
wherein the flight control system comprises a first flight controller means, and a second flight controller means arranged to interact with the electronic control unit, whereby in the second mode the electronic control unit limits the authority of the second flight controller means to move the throttle below the prescribed minimum throttle setting.

2. The method of controlling an internal combustion engine according to claim 1 wherein the minimum permissible throttle setting is determined corresponding to the load demand and current environmental conditions.

3. The method according to claim 1 wherein the first flight controller means comprises a controller external from the engine.

4. The method according to claim 3 wherein the controller is ground-based or a ground station associated with an unmanned aerial vehicle powered by the engine.

5. The method according to claim 4 wherein the controller comprises a remote controller provided with an interface operable by a user or operator.

6. The method according to claim 1 wherein the second flight controller means comprises a controller local to or on-board the engine.

7. The method according to claim 6 wherein the controller is incorporated in or with the electronic control unit.

8. The method according to claim 7 wherein the electronic control unit comprises an engine control unit, and wherein the controller comprises an on-board controller co-located with the engine control unit.

9. The method according to claim 8 wherein the on-board controller is arranged in communication with the engine control unit.

10. The method according to claim 8 wherein the engine control unit is arranged in communication with the throttle for sending appropriate command signals from the engine control unit to the throttle.

11. The method according to claim 1 wherein the prescribed minimum throttle setting is generated by reference to a data structure.

12. A method of controlling an internal combustion engine having a combustion chamber and a throttle for regulating fluid flow to the combustion chamber, the throttle being operable under the control of an electronic control unit, the method comprising providing first and second modes available for operation of the engine, wherein in the first mode the engine is operable at a throttle setting set by a request from a first remote controller via a second on-board controller and wherein in the second mode the engine is operable at a prescribed minimum throttle setting asserted by the electronic control unit which limits the authority of the on-board controller, the method further comprising determining a throttle setting arising from a request from the remote controller, comparing the determined throttle setting with the prescribed minimum throttle setting asserted by the electronic control unit, wherein the engine is caused to operate in the second mode if the throttle setting determined from the request of the remote controller is less than the prescribed minimum throttle setting.

13. A vehicle powered by an internal combustion engine, the engine being controlled by a method according to claim 1.

14. A vehicle powered by an internal combustion engine, the engine being controlled by a method according to claim 12.

15. A control system for an internal combustion engine having a combustion chamber and a throttle for regulating fluid flow to the combustion chamber, the throttle being operable under the control of an electronic control unit, the control system comprising a first remote controller and a second on-board controller, the remote controller being configured to request a throttle setting for operation of the engine via the on-board controller in a first mode, the electronic control unit being configured to assert a prescribed minimum throttle setting for operation of the engine in a second mode, means for determining a throttle setting arising from the request from the remote controller via the on-board controller, means for comparing the determined throttle setting with the prescribed minimum throttle setting asserted by the electronic control unit, wherein the engine is caused to operate in the second mode if the throttle setting determined from the request of the remote controller is less than the prescribed minimum throttle setting.

16. The control system according to claim 15 wherein the second on-board controller is incorporated in or with the electronic control unit.

17. The control system according to claim 15 wherein the electronic control unit comprises an engine control unit, and wherein the second on-board controller is co-located with the engine control unit.

18. The control system according to claim 17 wherein the second on-board controller is arranged in communication with the engine control unit.

19. The control system according to claim 17 wherein the engine control unit is arranged in communication with the throttle for sending appropriate command signals from the engine control unit to the throttle.

20. A vehicle powered by an internal combustion engine, the engine having a control system according to claim 15.

21. The vehicle according to claim 20 wherein the vehicle comprises an unmanned aerial vehicle.

\* \* \* \* \*